United States Patent Office 3,475,250
Patented Oct. 28, 1969

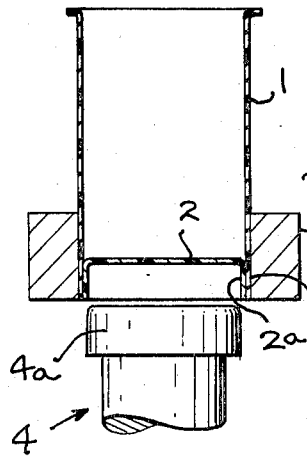
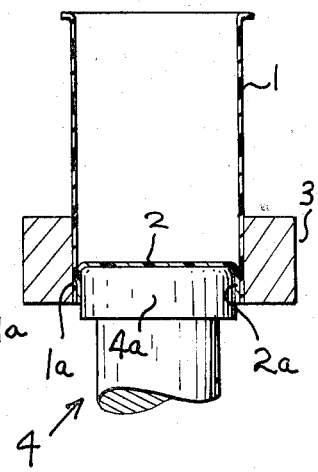
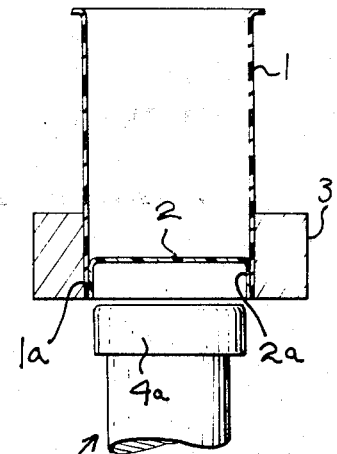
FIG. 1a     FIG. 1b     FIG. 1c
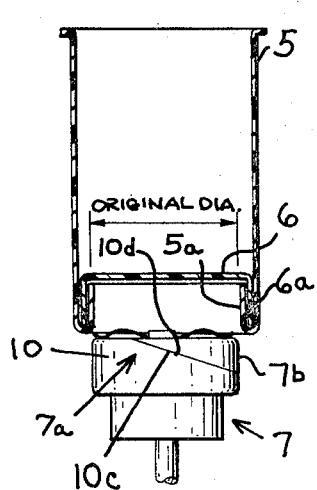
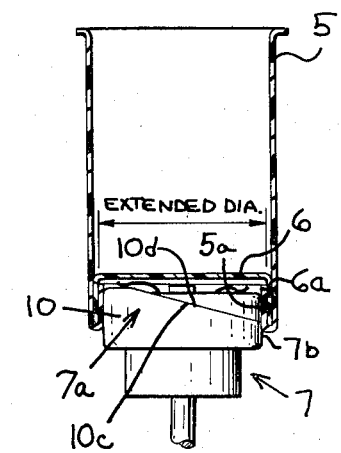
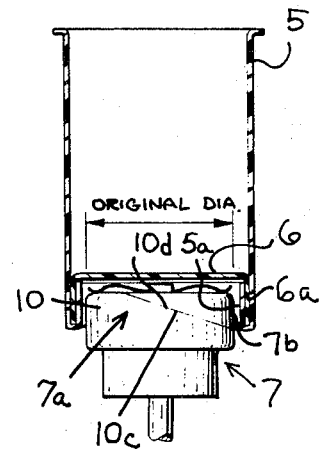
FIG. 2a     FIG. 2b     FIG. 2c

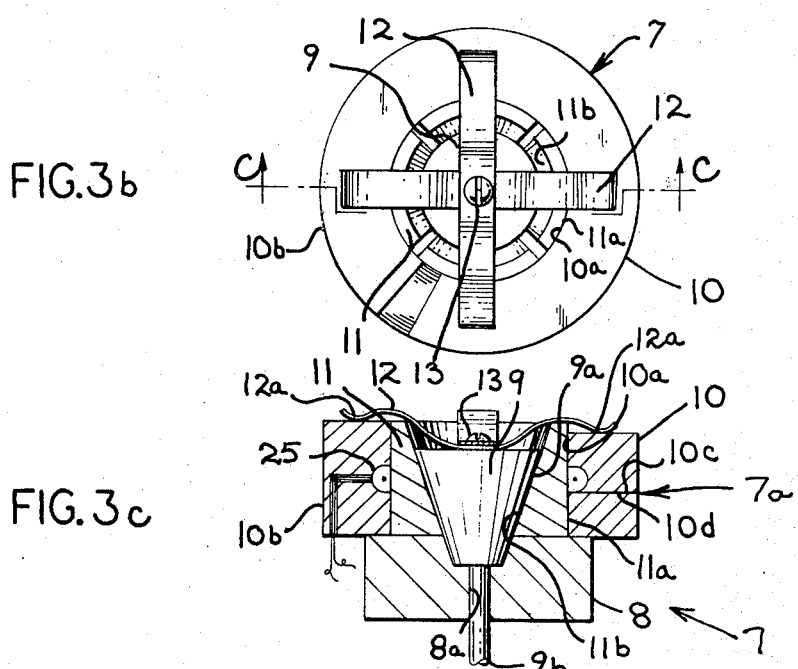
FIG. 3b
FIG. 3c
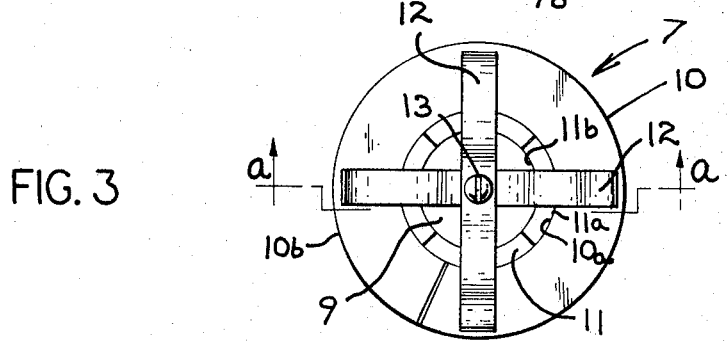
FIG. 3
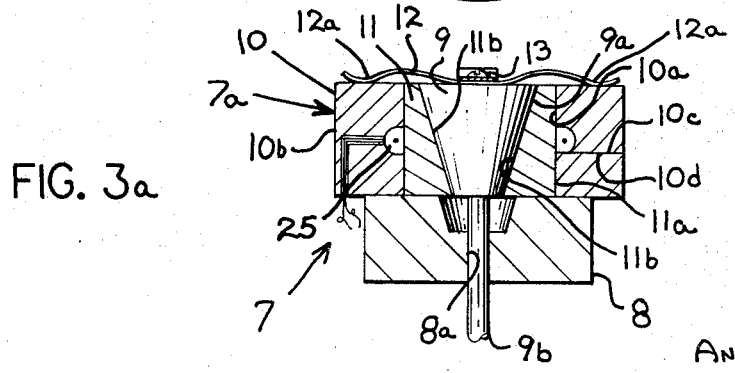
FIG. 3a
INVENTOR.
ANTHONY J. SCALORA
BY Philip M. Rice
& W. A. Schaich
ATTORNEYS

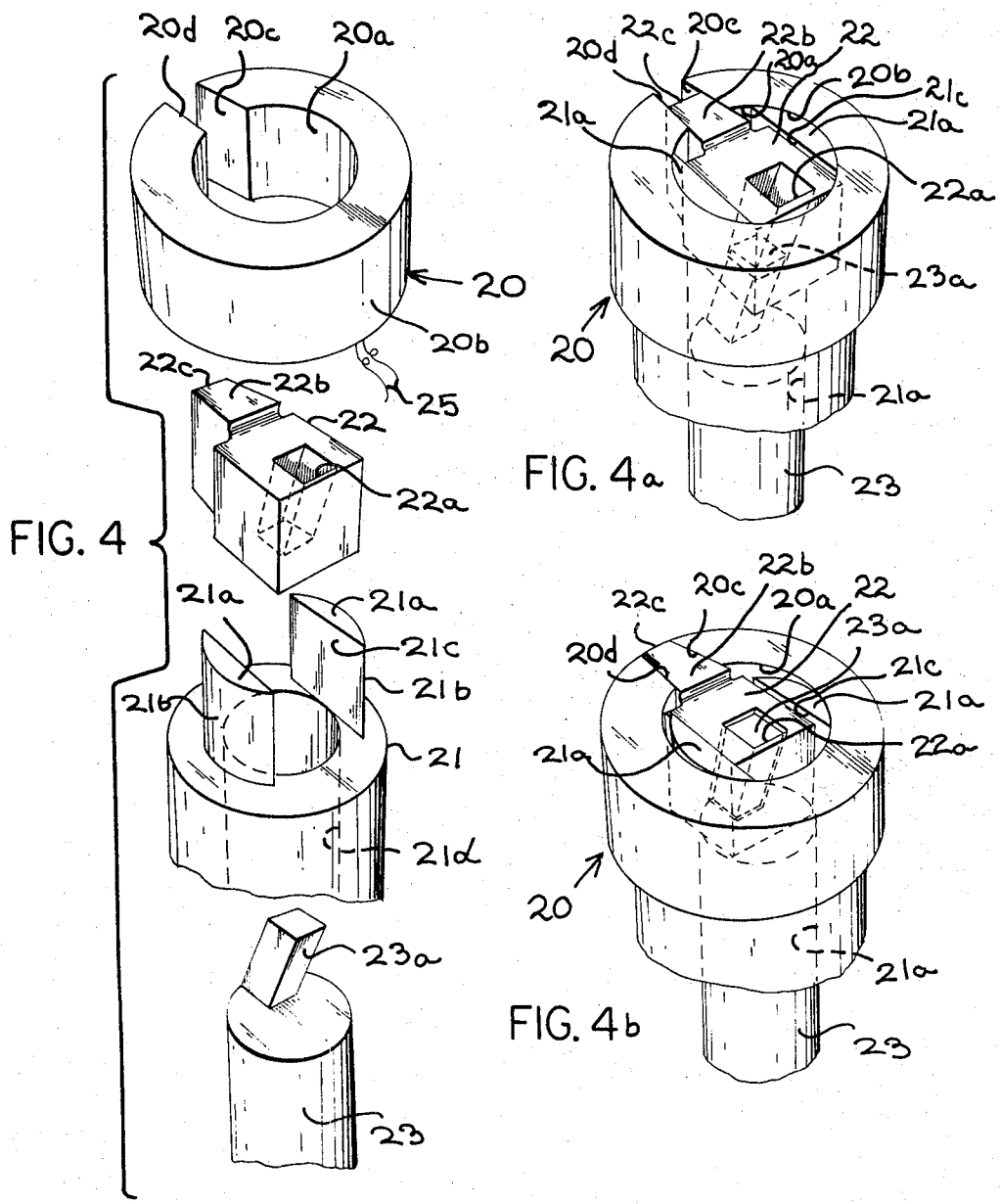

3,475,250
METHOD AND APPARATUS FOR HEAT SEALING
Anthony J. Scalora, Toledo, Ohio, assignor to Owens-Illinois, Inc., a corporation of Ohio
Filed Aug. 15, 1966, Ser. No. 572,544
Int. Cl. C09j 5/10; B32b 31/20
U.S. Cl. 156—293                                       9 Claims

ABSTRACT OF THE DISCLOSURE

Method and apparatus are provided for heat sealing together two annular members formed of thermoplastic material. A radially-expandable member is positioned within the innermost thermoplastic member and expanded radially outwardly to urge such member into contact with the outer member while heat is applied to seal such members together.

---

This invention relates to an improved method and apparatus for heat sealing annular plastic components.

As will be more fully described below, the known techniques for producing heat sealing of two annular thermoplastic members have been subject to a number of disadvantages when utilized in the high speed commercial production of quality items, such as thermoplastic containers. It is an object of this invention to provide an improved method for effecting the heat sealing of two annular thermoplastic members in a manner which will permit automation of the process to achieve a high rate of production and at the same time result in a reliable seal which will not adversely affect the quality of the resulting component.

Still another object of this invention is to provide an improved heat sealing tool for effecting the annular sealing of thermoplastic members.

Other objects and advantages of this invention will become apparent to those skilled in the art from the following detailed description, taken in conjunction with the annexed sheets of drawings, on which there are shown several embodiments of this invention.

On the drawings:

FIGS. 1a, 1b and 1c are schematic vertical sectional views respectively illustrating the successive steps employed in the existing process for producing a heat seal of two annular thermoplastic members.

FIGS. 2a, 2b and 2c are schematic vertical sectional views respectively illustrating the successive steps in the heat sealing process performed in accordance with this invention.

FIG. 3 is a top elevational view of one modification of a heat sealing tool embodying this invention.

FIG. 3a is a sectional view taken on the plane a—a of FIG. 3.

FIG. 3b is a view similar to FIG. 3, but with the components of the tool shown in their extended position.

FIG. 3c is a sectional view taken on the plane c—c of FIG. 3b.

FIG. 4 is an exploded perspective view of a modified heat sealing tool embodying this invention.

FIG. 4a is an assembled perspective view of the modified sealing tool of FIG. 4 with the components thereof shown in the retracted position of the tool.

FIG. 4b is a view similar to FIG. 4a with the components of the tool shown in their extended or expanded position.

As shown on the drawings:

The advantages of the heat sealing method and apparatus embodying this invention will be more apparent after consideration of the conventional method and apparatus employed to produce a circumferential heat seal of two annular thermoplastic members. Thus, FIGS. 1a, 1b and 1c show an example of conventional heat sealing of a thermoplastic bottom 2 to a tubular body member 1. Each of these members is formed from compatible thermoplastic materials which are heat sealable upon the application of a suitable temperature and pressure. Bottom member 2 is of disc shape configuration and is provided with an annular depending flange 2a which is to be heat sealed to the annular bottom portions 1a of the tubular body member 1. Members 1 and 2 are first disposed in nested relationship with the annular segments 1a and 2a thereof in juxtaposition. This assemblage is then inserted within a solid backup ring 3. A heat seal is conventionally performed by moving a heated plunger 4 into the bore of the innermost one of the nested annular thermoplastic segments, here the segment 2a. Tool 4 has an enlarged head portion 4a which is dimensioned to provide an interference fit within the diameter of the annular segment 2a. Thus, as the tool 4 is axially advanced relative to the nested thermoplastic segments, the innermost annular segment 2a is forced outwardly by the head portion 4a of the tool into a compressed relationship against the outermost annular segment 1a and the backup ring 3, thus achieving the relationship illustrated in FIG. 1b. Since the head portion 4a is heated, the combined application of heat and pressure effects a circumferential sealing of the annular segment 2a to the annular segment 1a. As a last step, the tool 4 is axially retracted from the sealed members.

This prior art technique suffers from a number of obvious disadvantages. In the first place, it is well known that any mass produced thermoplastic members cannot be formed to precise dimensions. Therefore, the interference fit between the head portion 4a of the tool 4 and the innermost one of the annular thermoplastic segments is subject to substantial variation due to the normal dimensional variations of the thermoplastic members. Thus, the amount of pressure applied to effect each seal will be variable, hence resulting in an unpredictable sealing result.

Additionally, the movement of the tool head 4a into the bore of the innermost annular segment 2a inherently tends to produce wrinkling and distortion of the thermoplastic, particularly when it is considered that for high speed production, the tool head 4a must be substantially heated before insertion. Likewise, the employment of the backup ring 3 inherently results in the production of ring marks on the external surface of the tubular body portion 1. When quality appearance is desired for the resulting thermoplastic article, such ring marks are very undesirable.

Again, when the sealing tool 4 is removed from engagement with the thermoplastic segments, as illustrated in FIG. 1c, it will still have substantially the same surface temperature and thus inherently tend to drag the thermoplastic material with it, resulting in further distortion of the sealed portion of the resulting thermoplastic article.

Lastly, the amount of heat transferred to the thermoplastic segments varies substantially along their axial dimension. It is obvious that the entering edge portions of the annular thermoplastic segments will be in physical contact with the sealing tool for a much longer period than the other axial end portions and, since the heat is transferred primarily by conduction, there will be a substantial difference in the temperature of one axial end of the sealing zone relative to the other, hence contributing to a non-uniform seal, and degradation of the thermoplastic material at the hotter end of the sealing zone.

The abovementioned deficiencies of the known sealing processes are completely overcome by the utilization of the method and apparatus of this invention.

Referring to FIGS. 2a, 2b and 2c, the sealing of the two annular thermoplastic segments 5 and 6 is accomplished by a tool 7 having an expandable heated head portion 7a. The construction of this tool will be hereinafter described in detail, but from the process standpoint, the head portion 7a of tool 7 at the start of the sealing process has a diameter (or periphery in the case of an article of non-circular sectional configuration) slightly less than the diameter or periphery of the nested thermoplastic segments 5 and 6. This permits the head portion 7a of the tool 7 to be freely inserted within the inner most annular segment 5a without contacting any portion thereof during the insertion movement.

Referring to FIG. 2b, the heated head portion 7a of the tool 7 is then circumferentially expanded to force the innermost annular segment 5a outwardly around its entire periphery into a compressed relationship with the outer annular segment 6a. As will be hereinafter described in detail, the circumferential expansion of the head portion 7a of the tool 7 is accomplished without substantially impairing the continuity of the peripheral surface 7b of such head portion 7a. Thus the head portion 7a applies both heat and pressure concurrently to all portions of the nested annular thermoplastic segments and produces equal temperature and equal pressure conditions in all portions of the sealing area.

After sufficient time has elapsed to effect the heat seal, then, as illustrated in FIG. 2c, the head portion 7a of the tool 7 is circumferentially retracted to concurrently move out of engagement with all wall portions of the innermost annular thermoplastic segment 5a and the tool 7 can then be removed from the seal area without in any manner disturbing the already formed seal.

Additionally, by forming a re-entrant end portion 5a on the tubular thermoplastic member 5 into which the depending flange portion 6a of the themoplastic bottom element 6 is inserted, sufficient backing is provided in most instances to effect the desired seal without requiring the utilization of a backup ring. Of course, if the thermoplastic segments are of extremely small thickness, it may be necessary to employ a backup ring in the same manner as the conventional process described above in connection with FIGS. 1a, 1b, and 1c.

Referring now to FIGS. 3, 3a, 3b and 3c, there is shown one form of sealing tool capable of carrying out the above described process. The head portion 7a of tool 7 comprises a spring washer 10 which is formed of resilient metal and has an outer cylindrical sidewall 10b. The washer 10 thus resembles a solid helical spring having an overall length somewhat in excess of one full turn and a normal external diameter less than the internal diameter of the annular thermoplastic segments which are to be sealed. Of course, if the members to be sealed have an oval shape or other non-circular configuration, then spring washer 10 will be formed to an identical configuration but with a periphery slightly smaller than that of the members to be sealed.

The ends 10c and 10d of the washer 10 are tapered and lie in axial juxtaposition, as best shown in FIG. 2a. Thus, in fact, the spring washer 10 has an essentially solid cylindrical sidewall 10b. As said spring washer is readily expanded by any suitable actuating mechanism, the end portions 10c and 10d slide along each other, assuming the position best illustrated in FIG. 2b, but it will be noted that the external wall 10b of the spring washer 10 remains substantially cylindrical in configuration and is essentially solid.

One form of mechanism for expanding or contracting the spring washer 10 comprises a multisegment ring 11 having an outer wall 11a snugly conforming to the internal wall 10a of the spring washer 10 and a tapered inner wall 11b which cooperates with the correspondingly tapered surface 9a of a wedge plug 9. Washer 10 and ring 11 are in turn supported on a carrier block 8 which is centrally apertured at 8a to slidably mount the shaft 9b of the wedge plug 9. The spring washer 10 may be conveniently held in assembly relationship to block 8 by one or more spring strips 12 having its end portions 12a resting on the top surface of the spring washer 10 and its central portion secured to the top of wedge plug 9 by a bolt 13.

Thus, as illustrated in FIGS. 3b and 3c, when the shaft 9b is moved axially downwardly by a suitable operating member (not shown) the wedge plug 9 will concurrently force all pieces of the multipiece ring 11 in a radially outward direction and thus effect a radial expansion, hence a circumferential expansion of the spring washer 10 to effect the heat sealing operation in the manner indicated in FIG. 2b. Moving the shaft 9b axially upwardly will automatically permit the ring pieces 11 to move inwardly under the influence of the resilient forces developed in the expanded spring washer 10 to return the tool assembly to its normal position as employed in the process steps shown in FIGS. 2a and 2c.

Referring now to FIGS. 4, 4a, and 4b, there is shown a modified construction of a sealing tool for carrying out the method of the invention. Here the head portion of the sealing tool is provided by a resilient member 20 essentially comprising a radially split washer having its radial end faces 20c and 20d in opposed relationship. As in the previously described modification, the outer surface 20b of the spring washer 20 is essentially cylindrical or conforms to the shape of the annular thermoplastic members to be sealed.

Spring washer 20 is mounted upon a tubular support 21 having two spaced upstanding guide prongs 21a integrally formed thereon. The outer surfaces 21b of guide prongs 21a are shaped to conform to the internal bore 20a of the spring washer 20. The internal surfaces 21c of the guide prongs 21a are respectively planar and parallel to provide a sliding support for a wedge plug 22.

A wedge plug 22 is provided, having an inclined cam bore 22a and a projection 22b which is wedgingly insertable between the opposed end faces 20c and 20d of the spring washer 20. The end surface 22c of the projection 22b is contoured to conform the cylindrical configuration of the external surface 20b of the spring washer 20 when such is expanded. An actuator shaft 23 is slidably inserted in the bore 21d of tubular support 21. Shaft 23 has an upstanding inclined projection 23a which is slidably received in the cam bore 22a of the cam block 22.

In the normal position of these components as illustrated in FIG. 4a, the projection 22b lies freely between the opposed end faces 20c and 20d of the spring washer 20, thus, the spring washer 20 maintains its normal unstressed diameter or perihhery which is substantially less than the internal diameter or periphery of the annular thermoplastic segments that are to be sealed. Upward movement of the shaft 23 produces a camming action between the projection 23a of the shaft and the cam bore 22a of the wedge actuator 22 and shifts the wedge actuator in a radially outward direction, thus forcing the projection 22b between the opposed end faces 20c and 20d of the spring washer 20 to radially expand the spring washer. In the fully expanded position of the spring washer, illustrated in FIG. 4b, the outer surface 22c of the wedge actuator 22 will form a continuation of the cylindrical surface 20a of the spring washer 20, hence a substantially cylindrical and solid surface is moved against the annular thermoplastic segments in the manner illustrated in FIG. 2b.

In each of the tool constructions described, it is necessary that the sealing surfaces 10b or 20b be heated sufficiently to produce the required sealing temperatures in the thermoplastic segments. Such heating may be accomplished between each succesesive sealing operation by exposing such surfaces to the action of an infra-red or other source of heat (not shown). Alternately, electrical resistance heating elements 25 may be embedded in the spring washers 10 and 20 and electrical energy supplied thereto by the leads 25. If such electrical resistance heating is to be employed in the modification of FIG. 4, then it would be desirable to also insert a heating element (not shown) in the projection 22b so that all of the effective sealing surfaces of the tool may be heated to substantially the same temperature.

While I have referred to the annular members to be sealed as being of thermoplastic material, it is apparent that members of other materials, but having a thermoplastic coating, for example, plastic coated glass, metals, ceramics, or paper, could be sealed by utilization of the method and apparatus of this invention.

I claim:
1. The method of heat sealing together two annular nested thermoplastic segments comprising the steps of:
   (1) inserting within the innermost thermoplastic segment a spring washer having an outer circumference less than the internal circumference of the innermost thermoplastic segment;
   (2) circumferentially expanding said spring washer to compress a continuous annular band of said innermost segment against the outermost segment, and
   (3) the outer surface of said spring washer being heated to a degree sufficient to heat seal said segments together.

2. The method of claim 1 wherein step (2) is performed by moving an expanding wedge through the bore of said spring washer.

3. The method of claim 1 wherein as a preliminary step, the end of one of said annular thermoplastic segments is folded in re-entrant relationship and the end of the other annular thermoplastic segment is inserted into the re-entrant fold.

4. The method of claim 1, plus the step of circumferentially contracting the spring washer after the seal is formed and prior to withdrawing the spring washer from within the sealed segments.

5. Apparatus for heat sealing two annular nested members comprising a split spring washer having a substantially continuous exterior side wall, said side wall having a normal circumference less than the internal circumference of the innermost nested member, and means for circumferentially expanding said spring washer and maintaining the continuity of said exterior side wall.

6. The combination defined in claim 5 plus means for heating said spring washer.

7. The combination defined in claim 5 wherein said spring washer is in the form of a solid helical spring of greater than one turn in circumference, the ends of said spring washer being tapered and axially juxtapositioned so that the height of said spring washer is substantially uniform around its periphery.

8. The combination defined in claim 7 wherein said last mentioned means comprises a multipiece ring insertable in the bore of said spring washer, and an expansion plug insertable in said ring and axially movable relative thereto, said plug having an axially tapered external surface cooperable with all pieces of said ring to concurrently displace said pieces radially as a function of the axial position of said plug.

9. The combination defined in claim 5 wherein said spring washer is of a planar configuration so that the ends of the washer lie in opposed relationship, and said means for radially expanding said spring washer comprises a spacer member insertable between said opposed ends to displace same, the end surface of said spacer member being shaped to conform to and form part of the exterior wall of the spring washer.

References Cited
UNITED STATES PATENTS
| | | | |
|---|---|---|---|
| 2,744,655 | 5/1956 | Vnuk | 156—69 X |
| 3,184,362 | 5/1965 | Litsky et al. | 156—423 |
| 3,239,397 | 3/1966 | Hoyle | 156—69 |
| 3,382,121 | 5/1968 | Sherlock | 156—294 X |

HAROLD ANSHER, Primary Examiner

U.S. Cl. X.R.
156—306, 583